(12) United States Patent
Kripac

(10) Patent No.: US 6,867,771 B2
(45) Date of Patent: Mar. 15, 2005

(54) CONTROLLED FACE DRAGGING IN SOLID MODELS

(75) Inventor: Jiri Kripac, Fairfax, VA (US)

(73) Assignee: Autodesk, Inc., San Rafael, CA (US)

(*) Notice: Subject to any disclaimer, the term of this patent is extended or adjusted under 35 U.S.C. 154(b) by 172 days.

(21) Appl. No.: 10/141,642

(22) Filed: May 7, 2002

(65) Prior Publication Data

US 2003/0210242 A1 Nov. 13, 2003

(51) Int. Cl.$^7$ .............................................. G06T 17/00
(52) U.S. Cl. ..................................................... 345/420
(58) Field of Search ................................. 345/420, 419, 345/427, 418, 441

(56) References Cited

U.S. PATENT DOCUMENTS

| 4,821,214 A | 4/1989 | Sederberg |
| 5,396,590 A | 3/1995 | Kreegar |
| 5,815,154 A | 9/1998 | Hirschtick et al. |
| 6,308,144 B1 * | 10/2001 | Bronfeld et al. ............... 703/2 |
| 6,628,279 B1 * | 9/2003 | Schell et al. ................. 345/420 |
| 2003/0067487 A1 * | 4/2003 | Kohls et al. ................. 345/764 |

FOREIGN PATENT DOCUMENTS

WO    WO 95/11482    4/1995

* cited by examiner

*Primary Examiner*—Don Wong
*Assistant Examiner*—Huedung X. Cao
(74) *Attorney, Agent, or Firm*—Gates & Cooper LLP

(57) ABSTRACT

One or more embodiments of the invention provide a method, apparatus, and article of manufacture for modifying a three-dimensional model. A three-dimensional model is displayed in a computer implemented solid modeling system. A first face of the three-dimensional model is then selected. A first constraint that controls a behavior of a repositioning operation for the first face is specified. Once the face and constraint have been selected/specified, the three-dimensional model is modified by repositioning the selected first face, wherein the repositioning operation is constrained in accordance with the specified first constraint.

24 Claims, 13 Drawing Sheets

CONTROLLED FACE DRAGGING IN SOLID MODELS

CROSS-REFERENCE TO RELATED APPLICATIONS

U.S. patent application Ser. No. 10/132,544, filed on Apr. 25, 2002, entitled "FACE MODIFICATION TOOL", by Sha Wang, William L. Myers and John R. Wallace.

BACKGROUND OF THE INVENTION

1. Field of the Invention

The present invention relates generally to three-dimensional modeling systems based on boundary representations, and in particular, to a method, apparatus, and article of manufacture for the controlled dragging of faces in boundary representations and solid bodies.

2. Description of the Related Art

The use of solid modeling application programs is well known in the art. In a 3D solid modeling system, a 3D model (also referred to as an object model) may be constructed, displayed, modified, etc. A solid model may be presented to the user by displaying the boundary of the model (referred to as a boundary representation or B-rep). Further, the boundary representation has multiple individual faces. To manipulate/modify the model, a face of the boundary representation may be dragged/repositioned using a cursor control device such as a mouse. However, when a single face is dragged, adjacent faces (i.e., faces that share common edges and vertices with the face being dragged) may become invalid. For example, an adjacent face that was originally planar may become non-planar when vertices shared between the dragged face and adjacent face are repositioned (such that the vertices of the adjacent face do not lie on the same plane any more).

Additionally, in prior art solid modeling application programs, the user cannot control how adjacent faces should be adjusted during a face dragging operation. For example, without input from the user, a solid modeling application program may adjust adjacent faces in a predetermined manner during a face dragging operation. Thus, the user is not provided with any option(s) and does not have the capability to control or elect between multiple different types of face dragging operations.

Accordingly, what is needed is a method, system, and article of manufacture for repositioning a face of a boundary representation while providing the user with options to control the repositioning operation.

SUMMARY OF THE INVENTION

One or more embodiments of the invention provide a method, apparatus, and article of manufacture for repositioning individual faces in a topological structure of boundary representation solid bodies, such as during the dragging of faces in solid bodies. The boundary representation solid bodies are facetted (i.e., all of the faces are planar and all face vertices lie on the same plane).

Two constraints control the behavior of the face repositioning operation. These two constraints are selectable by the user, who thus controls the outcome of the face repositioning operation.

The first constraint constrains the planes of the faces adjacent to the face being repositioned not to change (i.e., the slopes of adjacent faces remain fixed). The adjacent faces' edges and vertices may change, however, such as the faces may be stretched or shrunk.

The second constraint constrains the geometry of the face being repositioned to be fixed (i.e., the face is repositioned as rigid and only its location changes).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A method, apparatus, and article of manufacture provide for the ability to modify/reposition a face of a three-dimensional model in a solid modeling system based on the boundary representation of the solid models. To control the face repositioning operation, the user is provided with two user selectable constraints. The first constraint allows the user to determine whether to constrain the planes of faces adjacent to the face being repositioned to be fixed. The second constraint allows the user to determine whether to constrain the geometry of the face being repositioned to be fixed.

Hardware and Software Environment

Figure 1:
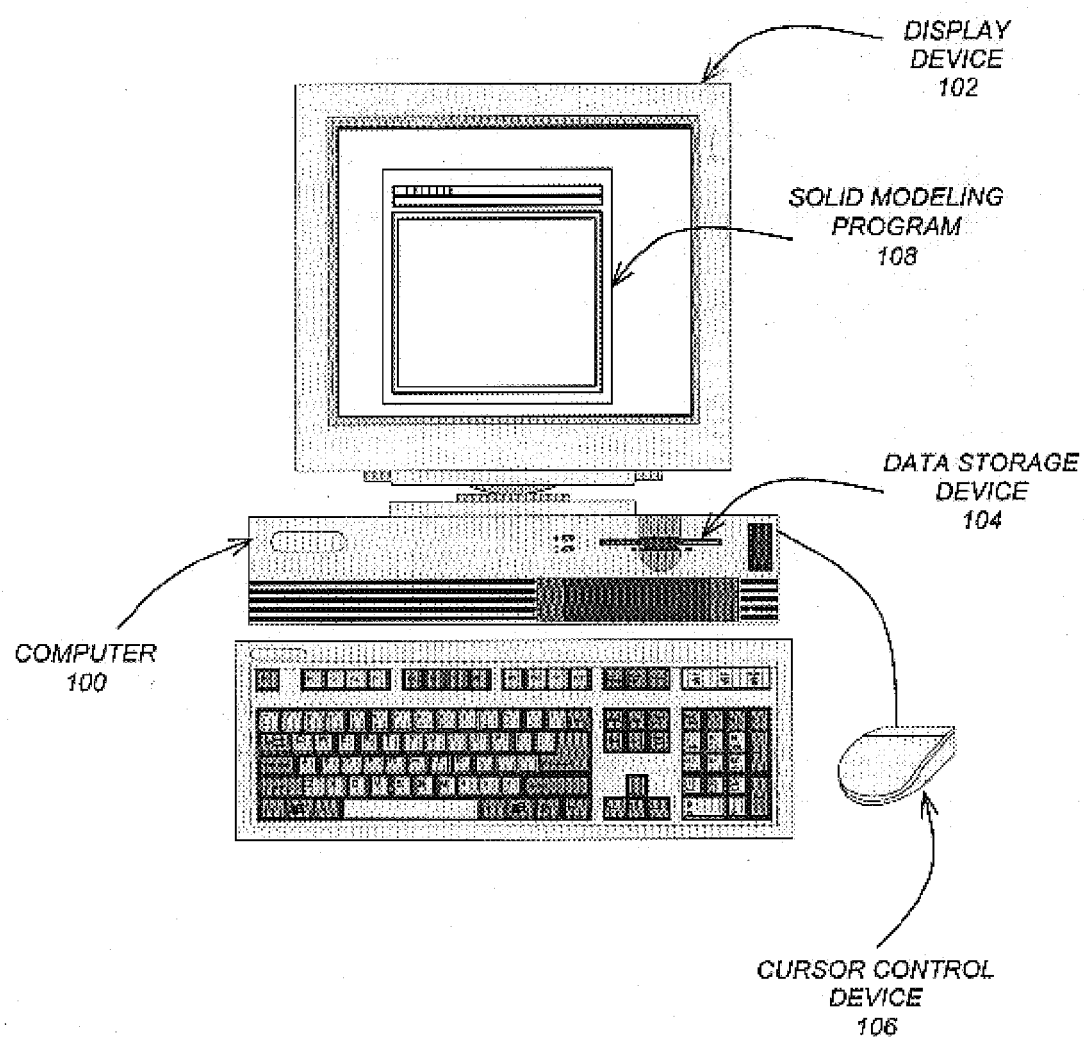
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented solid modeling program 108, wherein the solid modeling program 108 is represented by a window displayed on the display device 102. Generally, the solid modeling program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Solid Modeling Program

Figure 2:
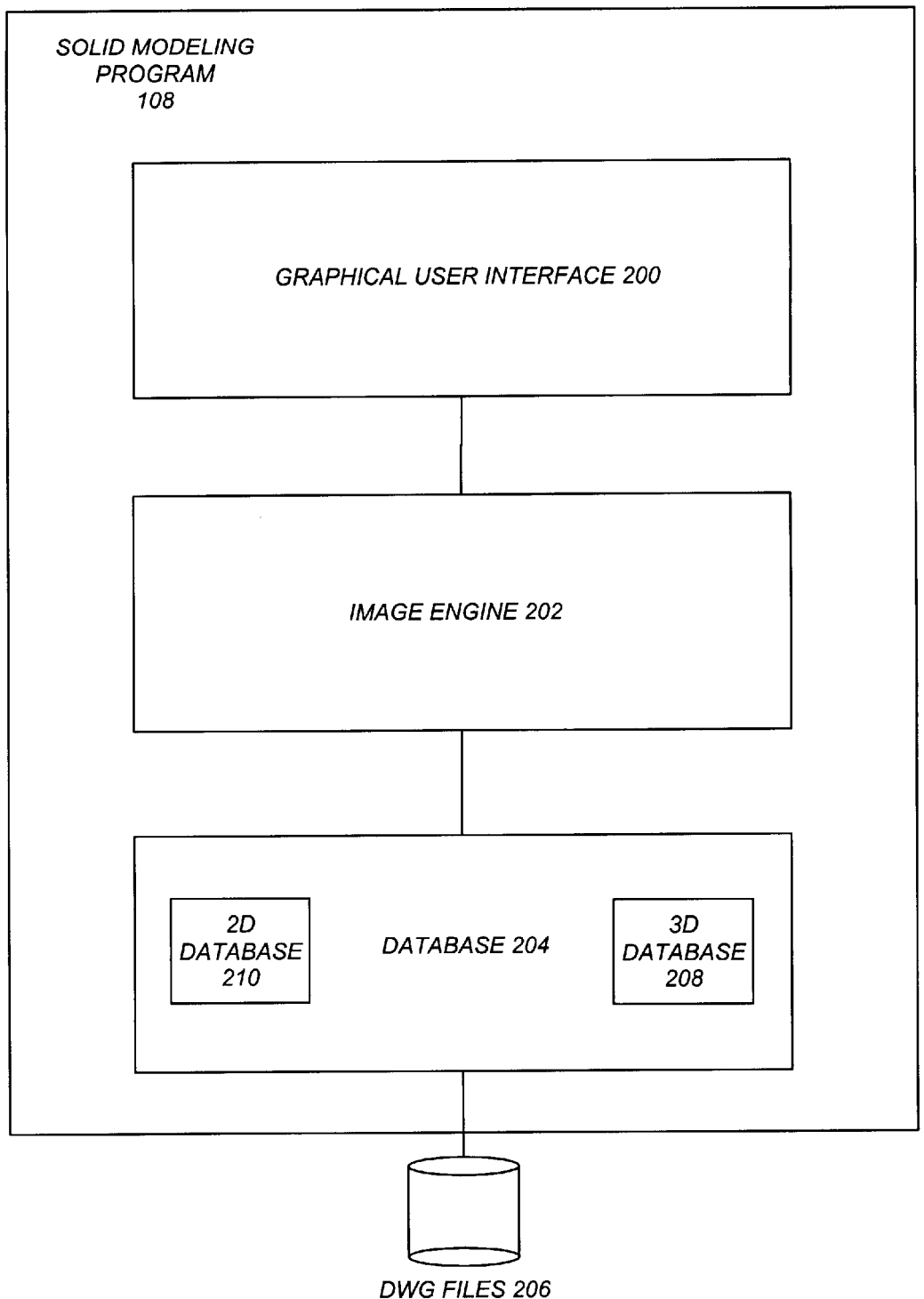
FIG. 2 is a block diagram that illustrates the components of a solid modeling program in accordance with one or more embodiments of the invention.

FIG. 2 is a block diagram that illustrates the components of the solid modeling program 108 in accordance with one or more embodiments of the invention. There are three main components to the solid modeling program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the solid modeling program 108.

The Image Engine 202 processes the DWG files 206 and delivers the resulting graphics to the monitor 102 for display. In one or more embodiments, the Image Engine 202 provides a complete application programming interface (API) that allows other computer programs to interface to the solid modeling program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Object List

Figure 3:
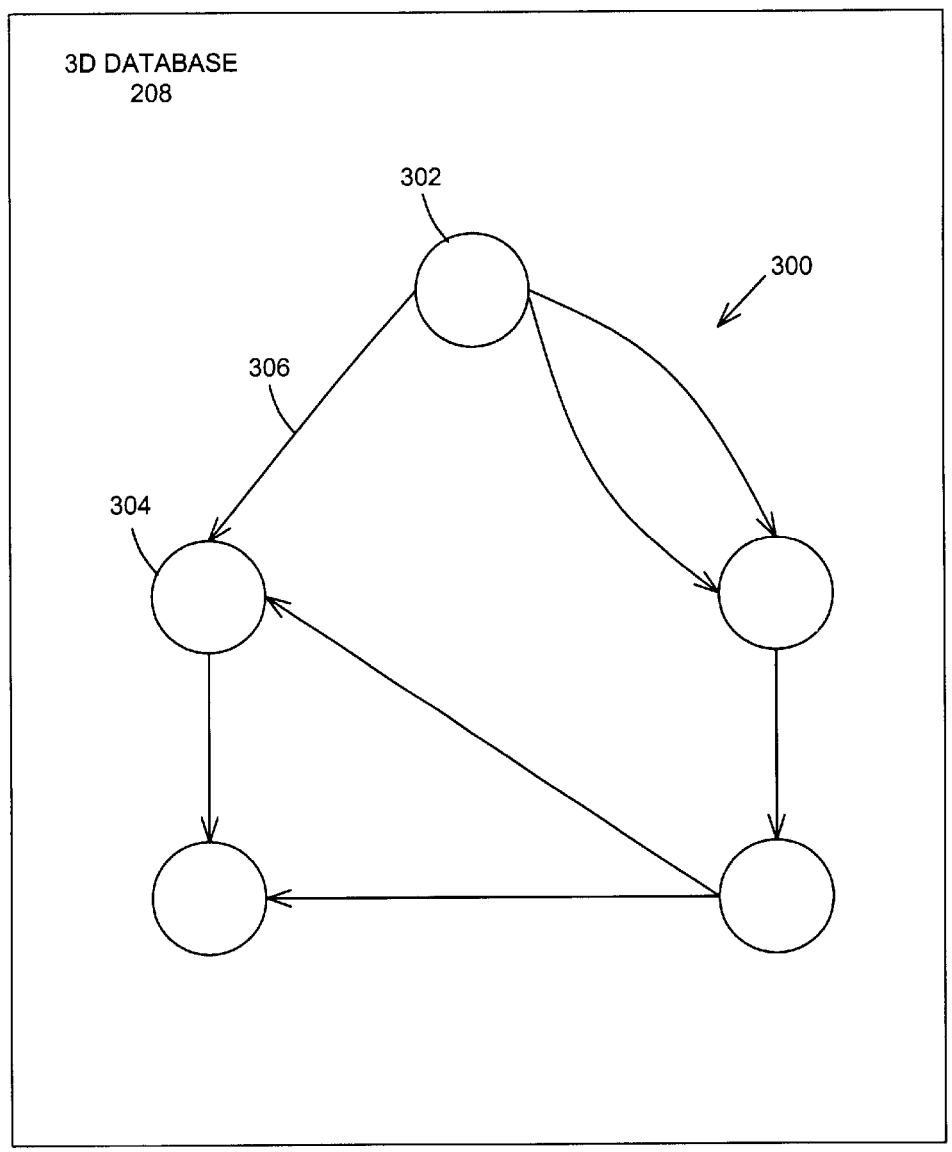
FIG. 3 is a block diagram that illustrates the structure of an object list maintained by a 3D database in accordance with one or more embodiments of the invention.

FIG. 3 is a block diagram that illustrates the structure of an object list 300 maintained by the 3D databases 208 in accordance with one or more embodiments of the invention. The object list 300 is usually comprised of a doubly linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 208.

Operation of the Software Embodiment

One or more embodiments of the invention provides a new method within solid modeling program 108 for repositioning individual faces in a topological structure of boundary representation solid bodies, such as during the dragging (e.g., grip-point editing) of faces in solid bodies. Two constraints are introduced to control the behavior of the face move/repositioning operation. The two constraints are selectable by the user (e.g., through a selectable option), who thus controls the outcome of the face repositioning operation.

The first constraint constrains the planes of faces adjacent to the face being repositioned not to change. Thus, while the edges and vertices of adjacent faces may change, the slopes of adjacent faces remain fixed. In other words, the adjacent faces may be stretched or shrunk on the same plane.

The second constraint constrains the geometry of the face being repositioned to be fixed. Thus, while the location of the face may change, the face (i.e., its size, rotation, etc) is repositioned as rigid.

Figure 4F:
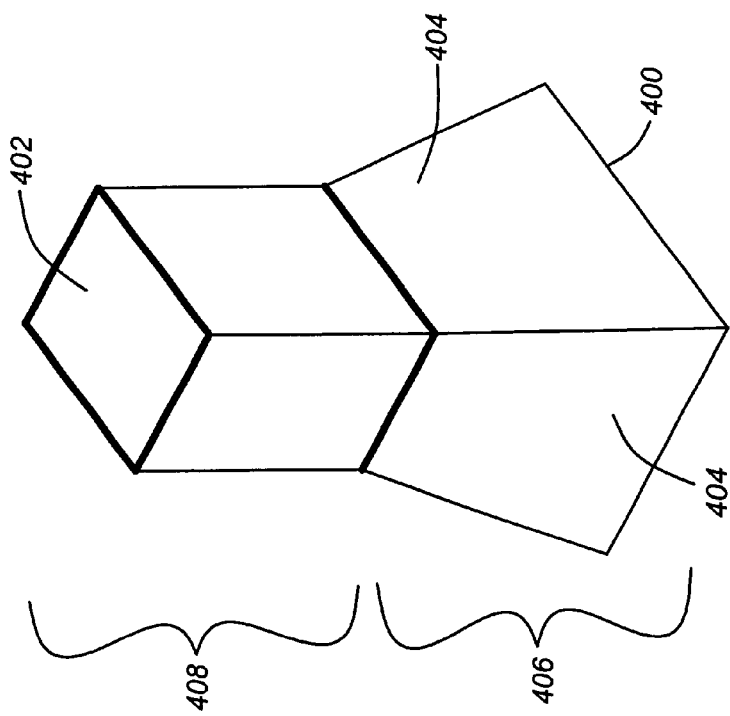
FIG. 4F illustrates the resulting operation after dragging the face of FIG. 4A while preserving both the first constraint and the second constraint in accordance with one or more embodiments of the invention.
Figure 4A:
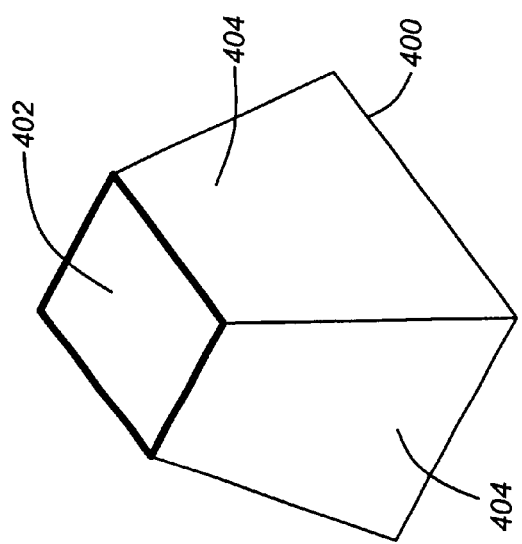
FIG. 4A illustrates an original pyramid whose top face is to be moved upwards in accordance with one or more embodiments of the invention.
Figure 4C:
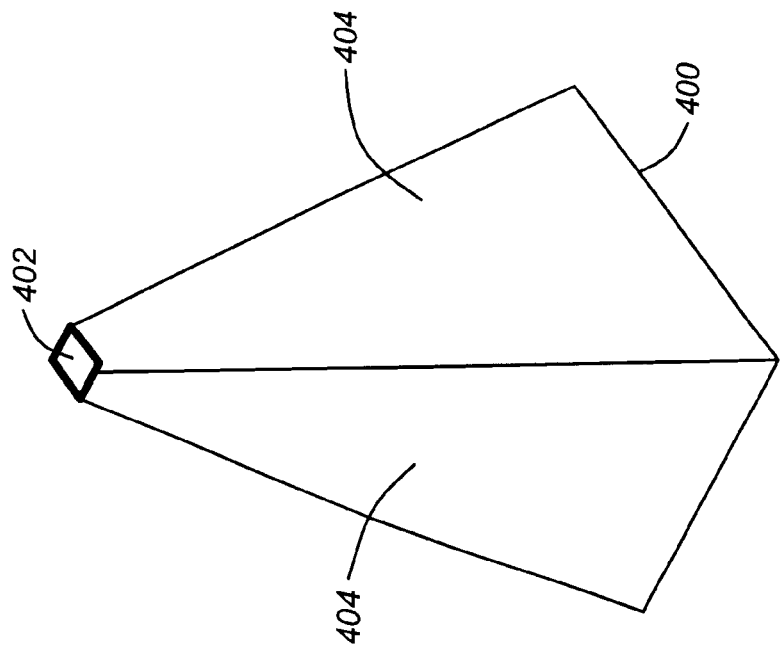
FIG. 4C illustrates the resulting operation after dragging the face of FIG. 4A while preserving a first constraint in accordance with one or more embodiments of the invention.
Figure 4B:
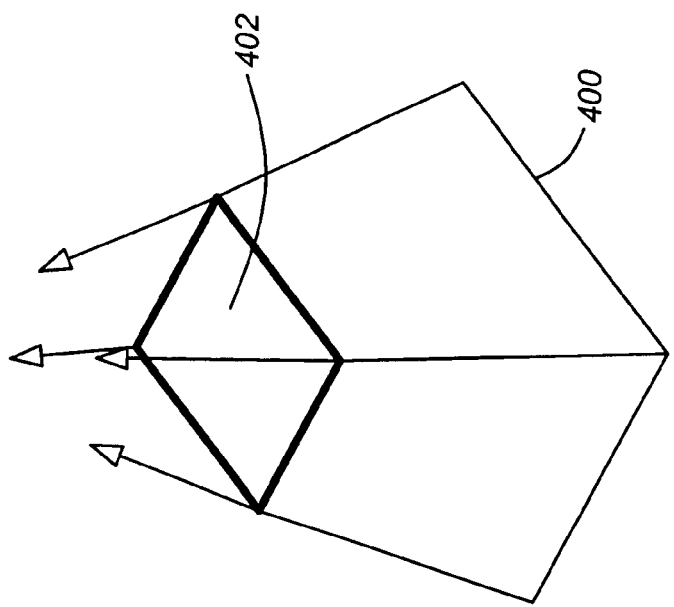
FIG. 4B illustrates the direction the vertices of the face of FIG. 4A will be moved when the first constraint is preserved during a repositioning operation in accordance with one or more embodiments of the invention.

FIGS. 4A–4F illustrate examples of the behavior of the face repositioning operation for different configurations of the constraints. FIG. 4A illustrates an oral pyramid 400 whose top face 402 is to be moved upwards. FIG. 4B illustrates the direction the vertices of face 402 will be moved when the first constraint is preserved during a repositioning operation. FIG. 4C illustrates the result of the operation after dragging the face 402 while preserving the first constraint. As illustrated, the planes of the adjacent faces 404 are not changed. Instead, the geometry of face 402 (i.e., the face being moved) is changed.

Figure 4E:
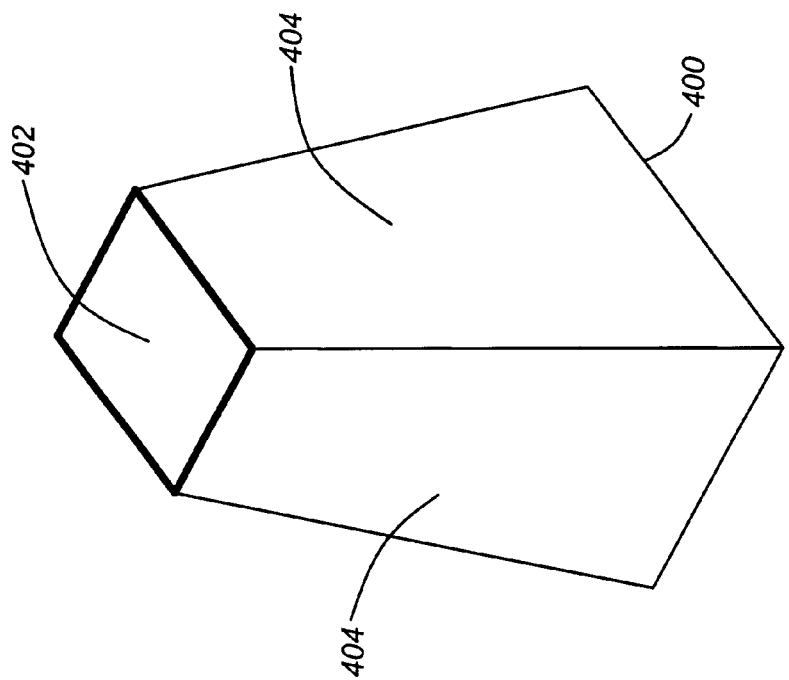
FIG. 4E illustrates the resulting operation after dragging the face of FIG. 4A while preserving the second constraint in accordance with one or more embodiments of the invention.
Figure 4D:
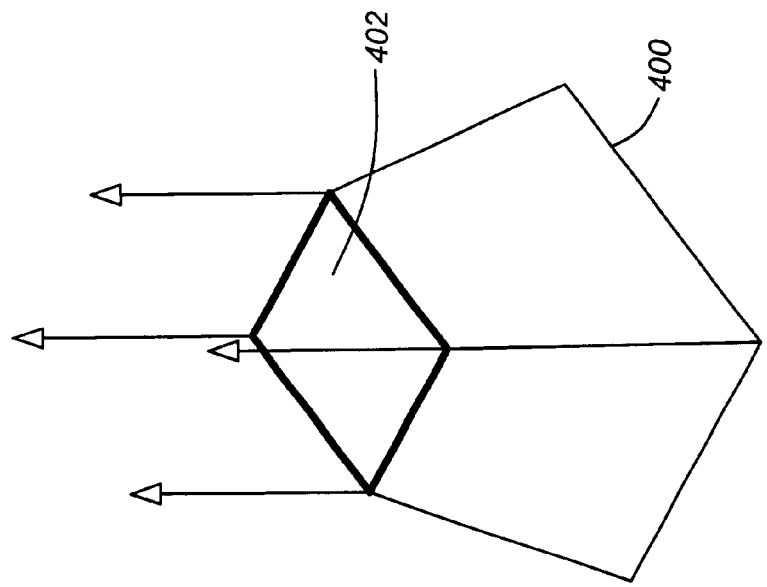
FIG. 4D illustrates the direction the vertices of the face of FIG. 4A will be moved when the second constraint is preserved during a repositioning operation in accordance with one or more embodiments of the invention.

FIG. 4D illustrates the direction the vertices of face 402 will be moved when the second constraint is preserved during a repositioning operation. FIG. 4E illustrates the result of the operation after dragging the face 402 while preserving the second constraint. As illustrated, the geometry of face 402 (i.e., the face being moved) is not changed. Instead, the planes of the adjacent faces 404 are changed.

FIG. 4F illustrates the result of the operation after dragging the face 402 while preserving both the first constraint and the second constraint. As illustrated, the planes of the adjacent faces 404 are not changed. Additionally, geometry of face 402 (i.e., the face being moved) is not changed. Instead, the resulting model 400 appears to be a composite model having a bottom component 406 similar to the original pyramid 400 and an upper component 408 comprised of the cubic structure formed by the repositioned face 402.

Logic of the Graphics Program

Figure 5:
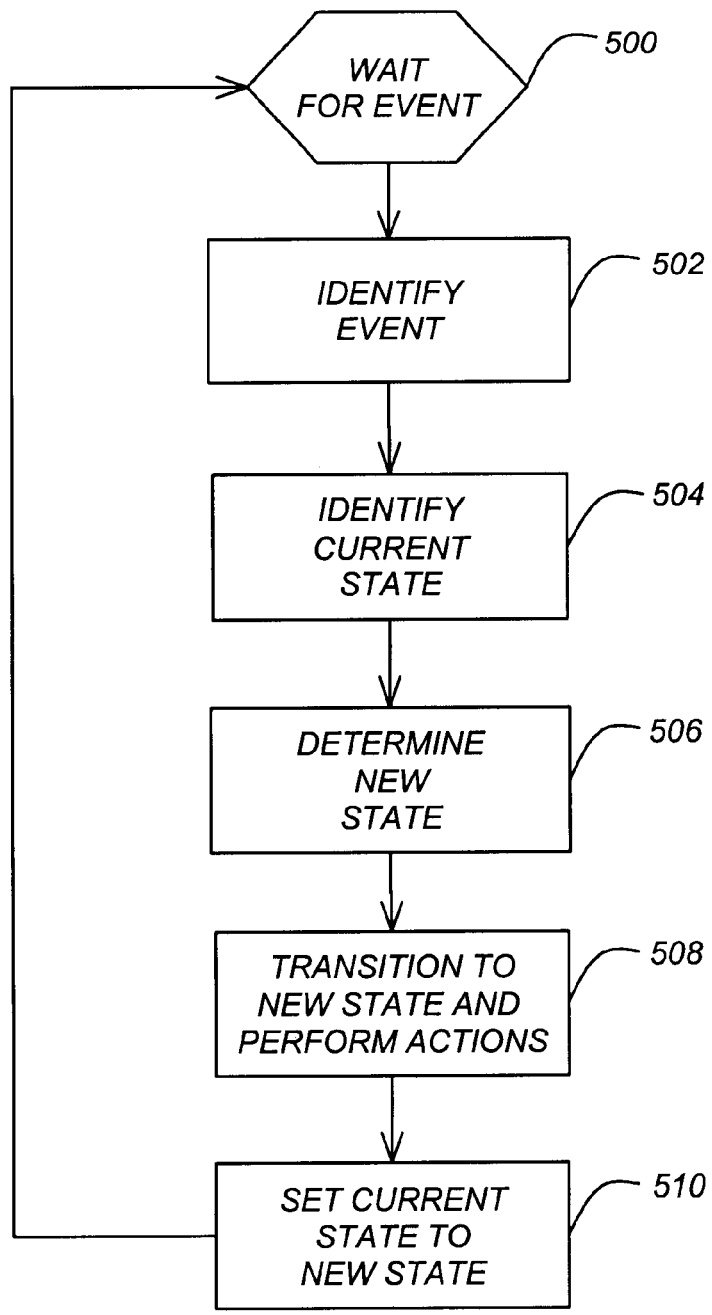
FIG. 5 is a flowchart that illustrates the general logic of a message or event-driven program performing the steps in accordance with one or more embodiments of the invention.

FIG. 5 is a flowchart that illustrates the general logic of a message or event-driven solid modeling program 108 performing the steps in accordance with one or more embodiments of the invention. In such a solid modeling program 108, operations are performed when transitions are made, based upon the receipt of messages or events, from present or current states to new states. Those skilled in the art will recognize that this logic is provided for illustrate purposes only and that different logic may be used to accomplish the same results.

Generally, the flowchart begins by waiting at block 500 for an event (e.g., a mouse button click). It should be appreciated that, during this time, other operating system tasks, e.g., file, memory, and video tasks, etc., may also be carried out. When an event occurs, control passes to block 502 to identify the event. Based upon the event, as well as the current state of the graphics solid modeling program 108 determined in block 504, a new state is determined in block 506. In block 508, the logic transitions to the new state and performs any actions required for the transition. In block 510, the current state is set to the previously determined new state, and control returns to block 500 to wait for more input events.

The specific operations that ate performed by block 508 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

Figure 6:
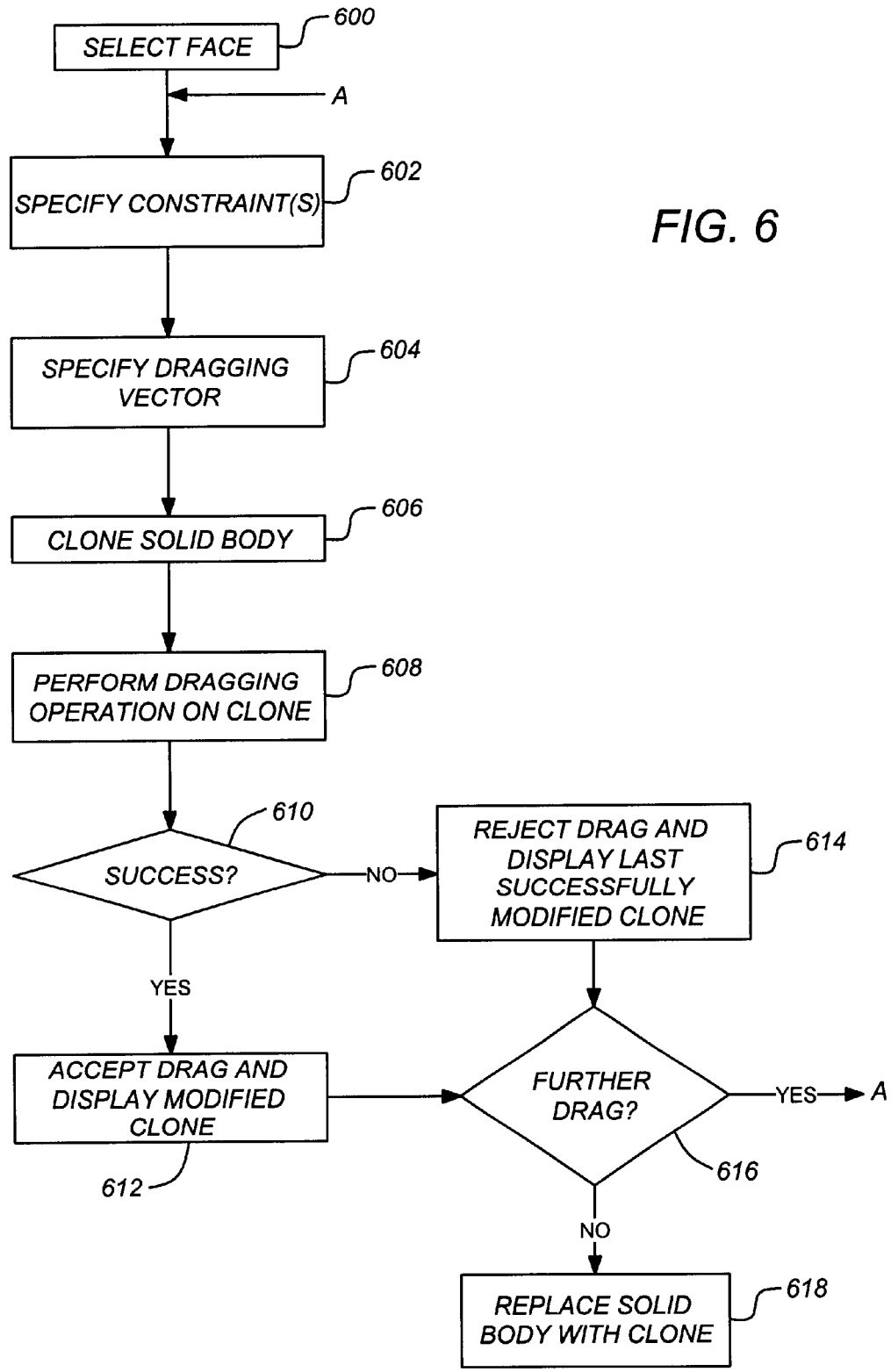
FIG. 6 is a flowchart illustrating a controlled face dragging operation in accordance with one or more embodiments of the invention.

FIG. 6 is a flowchart illustrating a controlled face dragging operation in accordance with one or more embodiments of the invention. At step 600, the user selects a first face of a boundary representation solid body (i.e., a three-dimensional model) that the user desires to drag. The selection (and future repositioning operation) may be performed/controlled graphically on the display device 102 by picking a face 402 using a graphical user interface of the modeling system/solid modeling program 108. However, the face 402 selection may be performed by any other means.

At step 602, the user specifies whether the one or more of the constraints described above (referred to as first constraint and second constraint) are required to be satisfied. Such specifying may be performed by the user specifying (or selection of an option for) a constraint that controls the behavior for the repositioning operation. For example, the user may press the <SHIFT> or <CTRL> keys on the keyboard. If no key is pressed, the first constraint may not be required to be satisfied and the second constraint may be required to be satisfied. If the <SHIFT> key is pressed, it may indicate the first constraint is required to be satisfied and the second constraint is not required to be satisfied. If the <CTRL> key is pressed, it may indicate that both constraints are required to be satisfied. Additionally, it should be noted that the selection of a constraint may be represented through the use of a Boolean flag.

Figure 7:
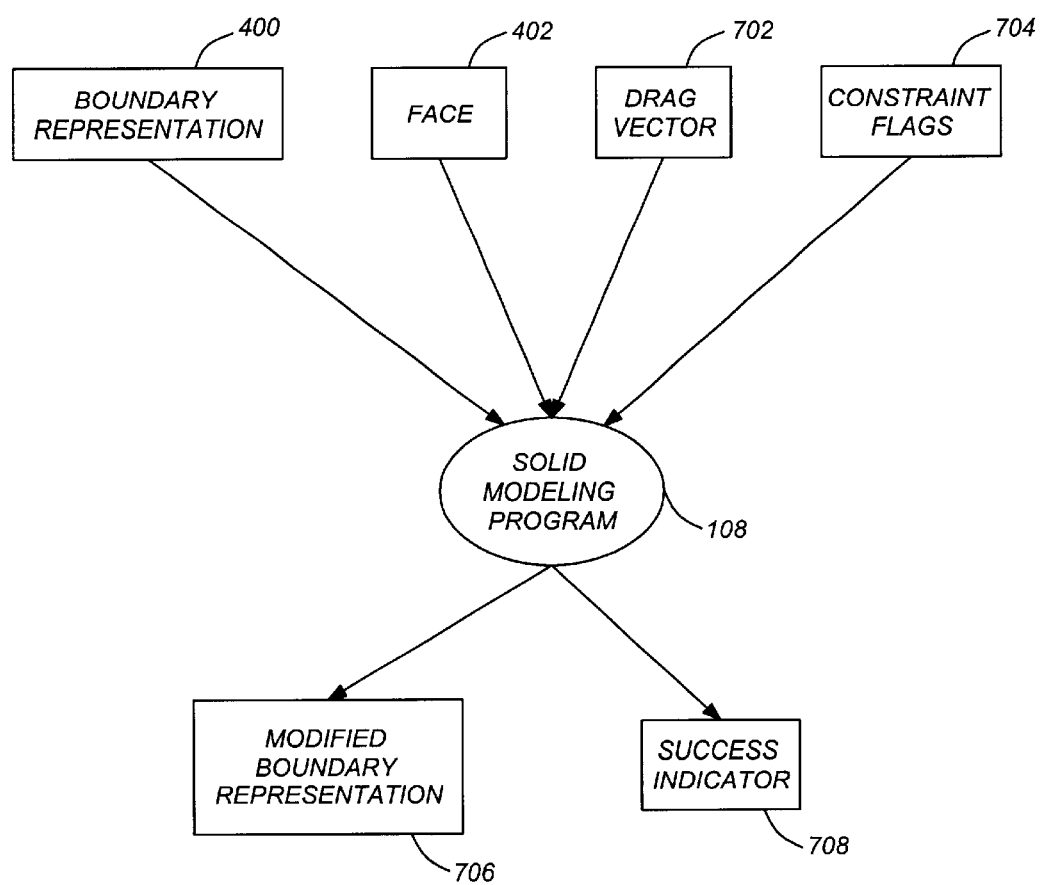
FIG. 7 illustrates the input to and output from a solid modeling program during a face repositioning operation in accordance with one or more embodiments of the invention.

FIG. 7 illustrates the input to and output from solid modeling program 108 during a face repositioning operation in accordance with one or more embodiments of the invention. Boundary representation 400, face 402 (selected at step 600), drag vector 702 (specified at step 604) and constraint flags 704 (selected at step 602) are used as input into solid modeling program 108. The repositioning operation is performed at steps 604–616, and the modified boundary representation 706, and a success indicator 708 (e.g., a flag indicating the success or failure of the operation) is returned as output.

Referring back to FIG. 6, steps 604–618 provide for modifying the three-dimensional model by repositioning the face 402 selected at step 600, wherein the repositioning operation is constrained in accordance with the specified constraint(s). At step 604, the user specifies the dragging vector (i.e., the displacement of the face 402 relative to its original position). The dragging vector is perpendicular to the face 402 plane. The specification of the dragging vector is often performed graphically using the graphical user interface of the modeling system/solid modeling program 108, but it may also be performed by entering a numerical value or by any other means.

At step 606, the original solid body (e.g., body 400) is cloned. At step 608, the controlled face dragging operation is performed on the cloned solid body obtained in step 606, on the face 402 selected at step 600, using the dragging vector specified at step 604, in accordance with the constraint(s) specified at step 602. Accordingly, the cloned solid body is modified by the operation.

At step 610, a determination is made regarding whether the dragging operation on the clone was successful. If the drag operation returns a success status, the dragging is accepted and the modified cloned solid body is displayed on display device 102 at step 612. Otherwise, the dragging is rejected and the last modified cloned solid body for which the dragging succeeded is displayed on display device 102 at step 614.

At step 616, a determination is made regarding whether the user keeps dragging the same face 402. If the same face 402 continues to be dragged, processing continues with step 602. Otherwise, the original solid body is replaced with the last modified cloned body for which the dragging operation succeeded at step 618 and the user interaction is complete.

Figure 8:
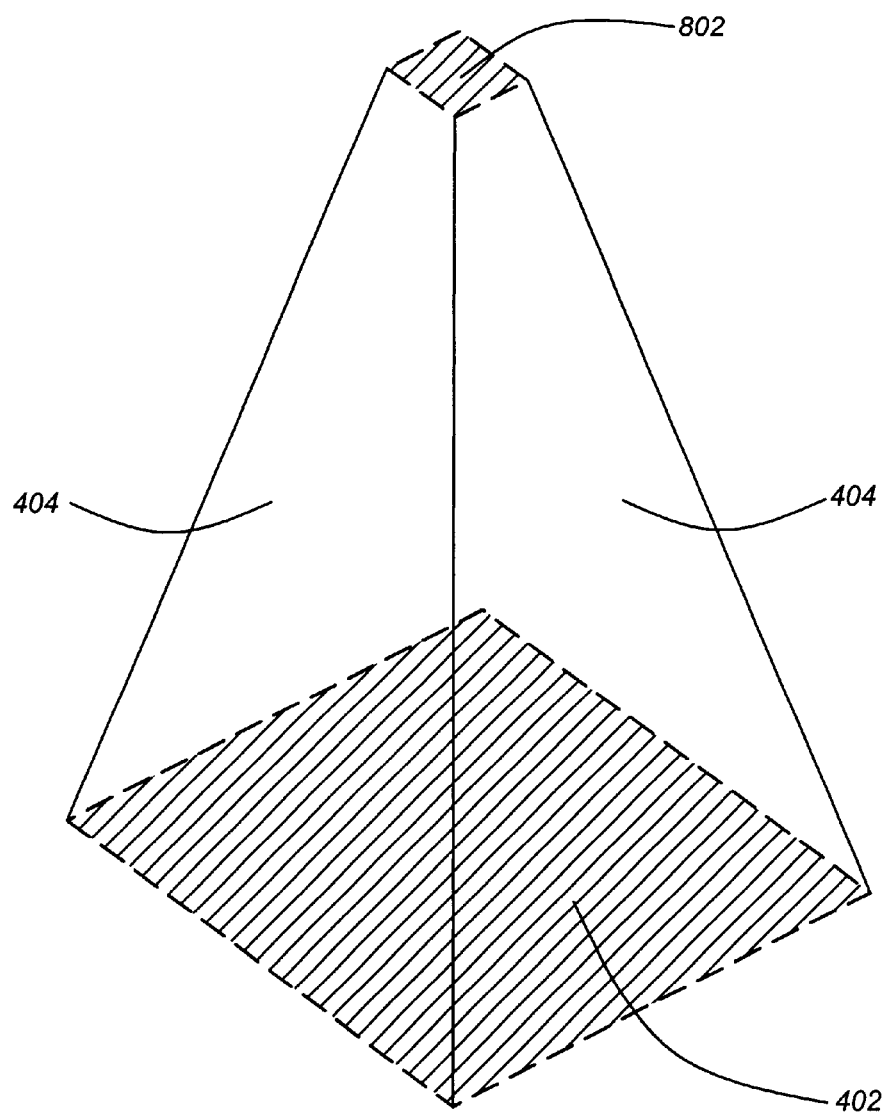
FIG. 8 illustrates a cloned solid body created during a repositioning operation in accordance with one or more embodiments of the invention.
Figure 9:
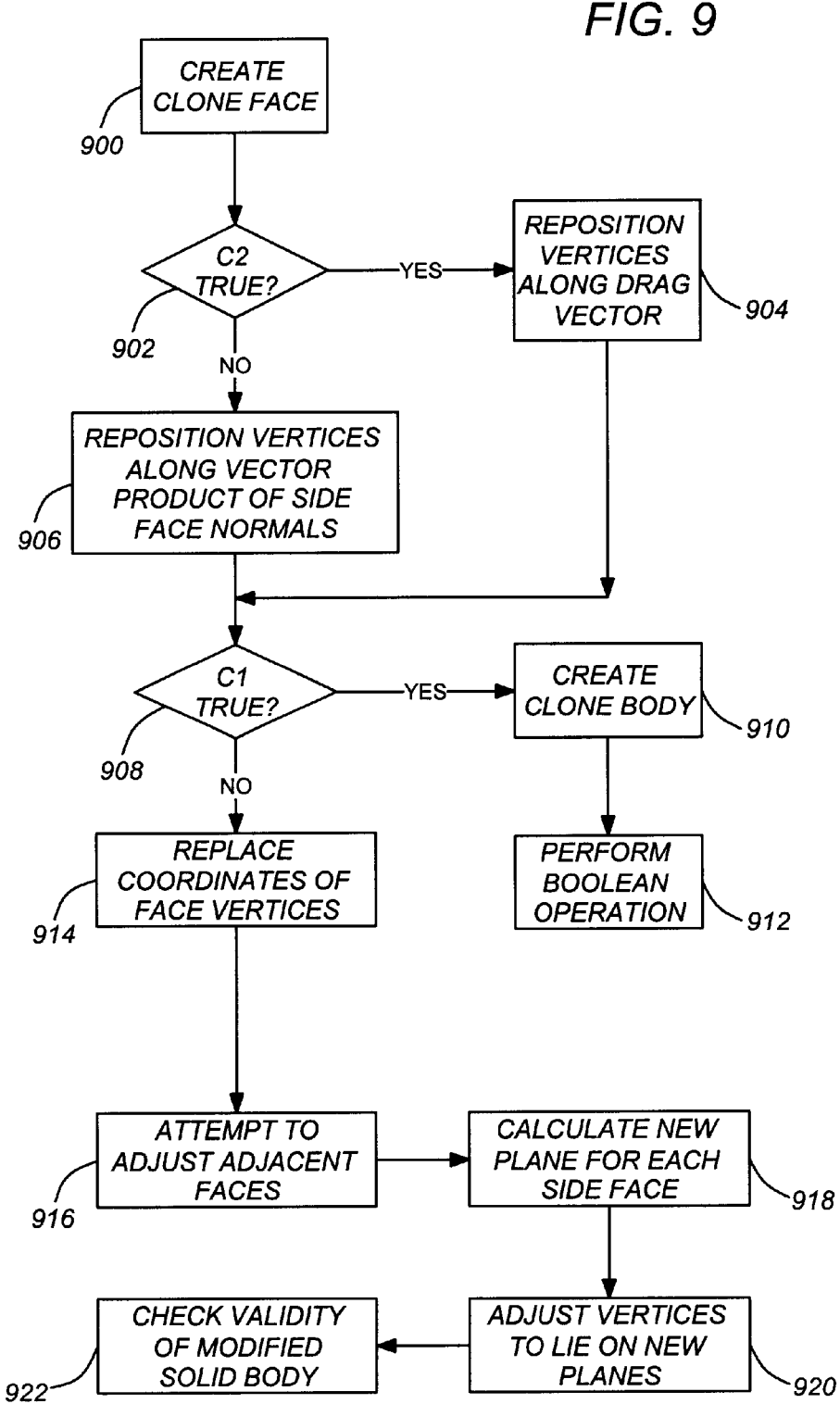
FIG. 9 is a flow chart illustrating the details a controlled face dragging operation in accordance with one or more embodiments of the invention.

Steps 606–618 are described in detail with respect to FIGS. 4A–F, 6, 7, 8, 9, 10, and 11. FIG. 9 is a flow chart illustrating the details of steps 606–618. A temporary face 802 (as illustrated in FIG. 8) that is a clone of original face 402 is created at step 900 with vertices repositioned relative to the vertices of original face 402. How the vertices are repositioned depends on the value of the constraint options/flags 704.

At step 902 a determination is made regarding whether the value of the second constraint flag C2 is true (i.e., whether the user has elected to preserve the geometry of the face being moved). If the second constraint is to be preserved (i.e., the value of the flag C2 is true), the vertices are repositioned along the drag vector 702 at step 904 as illustrated in FIGS. 4D and 4E. If the value of the second constraint flag C2 is false, each vertex is repositioned along a vector that is the cross product of the normal vectors of the side faces 404 incident at the vertex at step 906 as illustrated in FIGS. 4B and 4C.

At step 908, a determination is made regarding whether the value of the first constraint flag C1 is true (i.e., the user has elected to preserve the planes of the adjacent faces 404). If the first constraint is to be preserved (i.e., the value of the flag C1 is true), a solid body is created that is defined by the two faces—the original face 402 and the cloned face 802 (with the repositioned vertices), and by adding side faces 404 between the two faces at step 910 as illustrated in FIG. 8. At step 912, a Boolean operation is performed between the original solid body and the cloned solid body (created at step 910). If the drag vector 702 is in the direction of the face 402 normal vector, a Boolean operation union is performed. If the drag vector 702 is in the opposite direction, a Boolean operation subtraction is performed. The process is then complete and returns an indicator that the operation completed successfully.

Figure 10B:
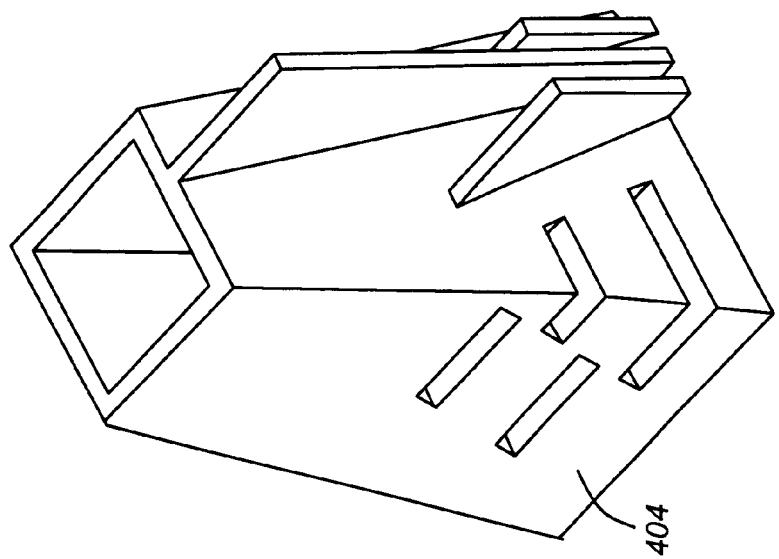
FIGS. 10A and 10B illustrate an example of the result of the adjustment of the vertices and planes of side faces in a more complex solid body where the side faces contain holes, cuts, and ribs in accordance with one or more embodiments of the invention.
Figure 10A:
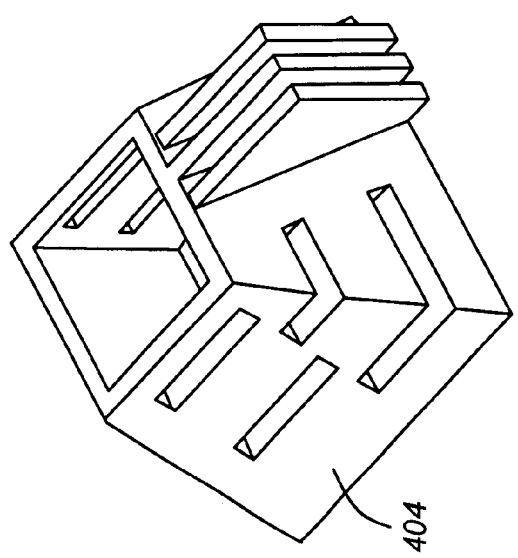

If the value of the first constraint flag C1 is false (as determined at step 908), the coordinates of the vertices of face 402 are replaced with the coordinates of the repositioned vertices of face 802 at step 914. The planes and vertices of the side faces 404 (faces sharing an edge with face 402) are attempted to be adjusted so that the side faces 404 remain planar (i.e., all vertices of each side face 404 still lie on the same plane) at step 916. FIGS. 10A and 10B illustrates an example of the result of the adjustment of the vertices and planes of side faces 404 in a more complex solid body where the side faces contain holes, cuts, and ribs.

Figure 11:
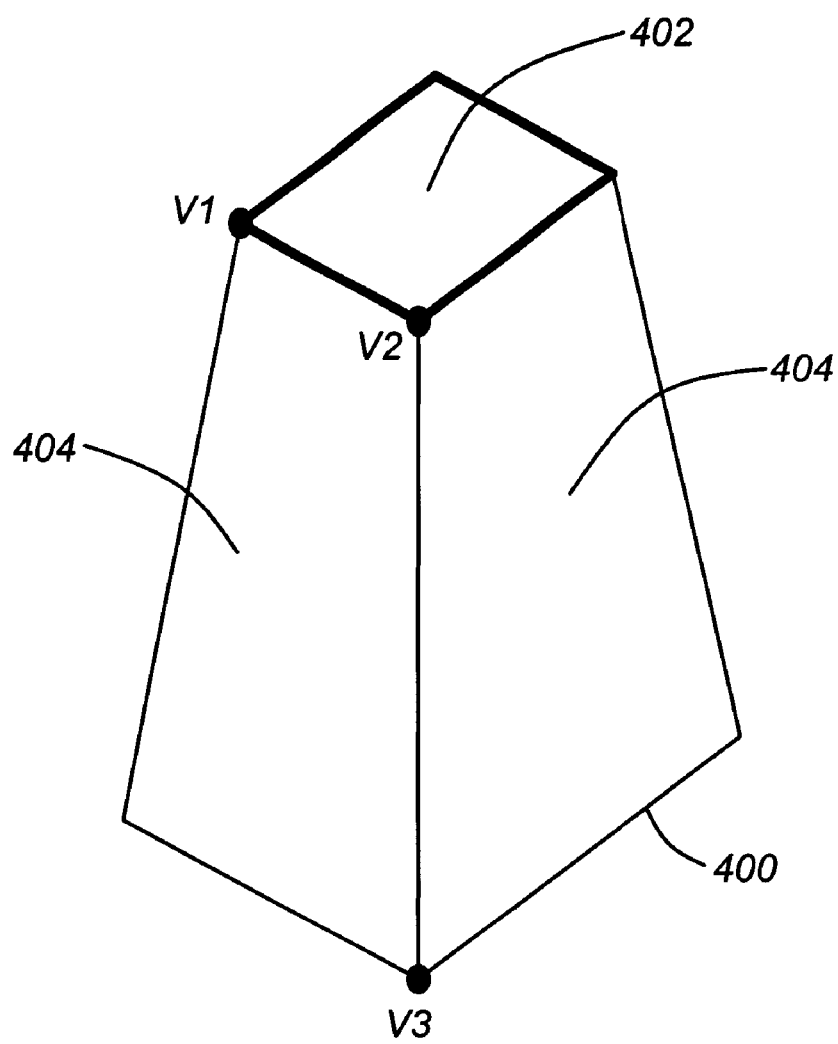
FIG. 11 illustrates how a new plane of a side face is determined in accordance with one or more embodiments of the invention.

FIG. 11 shows how the new plane of each side face is determined. The plane is defined by vertices V1, V2 of an edge of the repositioned face 402 and a third vertex V3 that is most distant from the edge. Specifically, for each side face 404 that shares an edge (bounded by vertices V1 and V2) with face 402 repositioned at step 914, a third vertex V3 that is most distant from the edge is found on the side face 404. A new plane of the side face 404 is then calculated from the three vertices V1, V2, and V3 at step 918. The vertices of each side face 404 that do not already lie on the new plane are adjusted to lie on the new plane at step 920. To perform the adjustment at step 920, the planes of all faces incident at the vertex (i.e., the planes of the repositioned face 402 and side faces 404) are collected. For the side faces 404, the newly calculated face planes, calculated at step 918, are used instead of the original planes.

To adjust the vertices at step 920, the number of planes are examined. If there are at least three non-coplanar planes, the intersection of any three planes is calculated and the resulting intersection point becomes the new coordinates of the adjusted vertex. If there are two non-coplanar planes, the coordinates of the original vertex are projected perpendicularly on a line that is the intersection between the two planes. The projected point becomes the new coordinates of the adjusted vertex. If there is a single plane (i.e., the plane of the repositioned face 402), the coordinates of the original vertex are projected perpendicularly to the plane. The projected point becomes the new coordinates of the adjusted vertex.

After the planes and vertices of all side faces 404 have been adjusted at steps 918 and 920, the validity of modified solid body 706 is checked at step 922. If the solid body 706 is valid, a flag 708 indicating a success may be returned. Otherwise, a flag 708 indicating a failure may be returned.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for modifying a three-dimensional model, comprising:
    (a) displaying a three-dimensional model in a computer implemented solid modeling system;
    (b) selecting a first face of the three-dimensional model;
    (c) specifying that a first constraint is not required to be satisfied, wherein the first constraint;
        (i) controls a behavior of a repositioning operation for the first face;
        (ii) constrains planes of faces adjacent to the first face not to change;
    (d) modifying the three-dimensional model by repositioning the selected first face by:
        (i) replacing one or more coordinates of vertices of the first face with coordinates of repositioned vertices based on the repositioning operation;
        (ii) attempting to adjust one or more planes and vertices of a face adjacent to the first face so that adjacent face remains planar;
        (iii) calculating a new plane for the adjacent face; and
        (iv) adjusting vertices of the adjacent face to lie on the new plane.

2. The method of claim 1, wherein adjusting the vertices of the adjacent face comprises:
    (a) collecting planes of all faces incident at a first vertex;
    (b) using the new plane instead of the collected plane for each adjacent face;
    (c) if there are at least three non-coplanar planes in the collected planes:
        (i) calculating an intersection of any three planes; and
        (ii) a resulting intersection point becomes new coordinates for the first vertex;
    (d) if there are two non-coplanar planes in the collected planes:
        (i) projecting coordinates of the first vertex perpendicularly on a line comprising an intersection between the two non-coplanar planes; and
        (ii) the projected coordinates become new coordinates for the first vertex;
    (e) if there is a single plane in the collected planes:
        (i) projecting coordinates of the first vertex perpendicularly to the single plane; and
        (ii) the projected coordinates become new coordinates for the first vertex.

3. The method of claim 1, wherein the specifying that the first constraint is not required to be satisfied is performed using a key on a keyboard.

4. A method for modifying a three-dimensional model, comprising:
    displaying a three-dimensional model in a computer-implemented solid modeling system;
    selecting a first face of the three-dimensional model;
    specifying that a first constraint is not required to be satisfied, wherein the first constraint controls a behavior of a repositioning operation for the first face and the first constraint constrains a geometry of the first face to be fixed; and
    modifying the three-dimensional model by repositioning the selected first face, wherein each of one or more vertices of the first face is repositioned along a vector that is a cross product of normal vectors of faces adjacent to the first face at each vertex.

5. A method for modifying a three-dimensional model, comprising:
    (a) displaying a three-dimensional model in a computer-implemented solid modeling system;
    (b) selecting a first face of the three-dimensional model;
    (c) specifying a first constraint that controls a behavior of a repositioning operation for the first face;
    (d) modifying the three-dimensional model by repositioning the selected first face, wherein the repositioning operation is constrained in accordance with the specified constraint, and wherein the modifying step comprises:
        (i) cloning the three-dimensional model;
        (ii) repositioning the selected first face on the cloned three-dimensional model to create a modified cloned three-dimensional model, wherein the repositioning operation is constrained in accordance with the specified first constraint;

(iii) accepting the repositioning if the repositioning operation returns a success status by displaying the modified cloned three-dimensional model; and (iv) rejecting the repositioning if the repositioning operation does not return a success status by displaying a last modified cloned three-dimensional model for which a repositioning was successful.

6. A computer-implemented system comprising:
   (a) a three-dimensional model displayed in a solid modeling system, wherein the model comprises a first face;
   (b) a method for modifying the first face, wherein the method is configured to:
      (i) select the first face;
      (ii) specify that a first constraint is not required to be satisfied, wherein the first constraint controls a behavior of a repositioning operation for the first face and constrains planes soft faces adjacent to the first face not to change;
      (iii) modify the three-dimensional model by repositioning the selected first face; by:
         (1) replacing one or more coordinates of vertices of the first face with coordinates of repositioned vertices based on the repositioning operation;
         (2) attempting to adjust one or more planes and vertices of a face adjacent to the first face so that adjacent face remains planar;
         (3) calculating a new plane for the adjacent face; and
         (4) adjusting vertices of the adjacent face to lie on the new plane.

7. The system of claim 6, wherein the method configured to adjust the vertices comprises:
   (a) collecting planes of all faces incident at a first vertex;
   (b) using the new plane instead of the collected plane for each adjacent face;
   (c) if there are at least three non-coplanar planes in the collected planes:
      (i) calculating an intersection of any three planes; and
      (ii) a resulting intersection point becomes new coordinates for the first vertex;
   (d) if there are two non-coplanar planes in the collected planes:
      (i) projecting coordinates of the first vertex perpendicularly on a line comprising an intersection between the two non-coplanar planes; and
      (ii) the projected coordinates become new coordinates for the first vertex;
   (e) if there is a single plane in the collected planes:
      (i) projecting coordinates of the first vertex perpendicularly to the single plane; and
      (ii) the projected coordinates become new coordinates for the first vertex.

8. The system of claim 6, wherein the method specifies that the first constraint is not required to be satisfied using a key on a keyboard.

9. A computer implemented system for modifying a three-dimensional model, comprising:
   (a) a three-dimensional model displayed in a solid modeling system, wherein the model comprises a first face;
   (b) a method for modifying the first face, wherein the method is configured to:
      (i) select a first face of the three-dimensional model;
      (ii) specify that a first constraint is not required to be satisfied, wherein the first constraint controls a behavior of a repositioning operation for the first face and the first constraint constrains a geometry of the first face to be fixed; and
      (iii) modify the three-dimensional model by repositioning the selected first face, wherein each of one or more vertices of the first face is repositioned along a vector that is a cross product of normal vectors of faces adjacent to the first face at each vertex.

10. A computer implemented system for modifying a three-dimensional model comprising:
    (a) a three-dimensional model displayed in a solid modeling system, wherein the model comprises a first face;
    (b) a method for modifying the first face, wherein the method is configured to:
       (i) select a first face of the three-dimensional model;
       (ii) specify a constraint that controls a behavior of a repositioning operation for the first face;
       (iii) modify the three-dimensional model by:
          (1) repositioning the first face, wherein the repositioning operation is constrained in accordance with the specified constraint;
          (2) cloning the three-dimensional model;
          (3) repositioning the selected first face on the cloned three-dimensional model to create a modified cloned three-dimensional model, wherein the repositioning operation is constrained in accordance with the specified first constraint;
          (4) accepting the repositioning if the repositioning operation returns a success status by displaying the modified cloned three-dimensional model; and
          (5) rejecting the repositioning if the repositioning operation does not return a success status by displaying a last modified cloned three-dimensional model for which a repositioning was successful.

11. An article of manufacture comprising a program storage medium readable by a computer and embodying logic executable by the computer to perform a method for modifying a three-dimensional model, wherein the logic comprises:
    (a) displaying a three-dimensional model in a computer implemented solid modeling system;
    (b) selecting a first face of the three-dimensional model;
    (c) specifying that a first constraint is not required to be satisfied wherein the first constraint:
       (i) controls a behavior of a repositioning operation for the first face;
       (ii) constrains planes of faces adjacent to the first face not to change;
    (d) modifying the three-dimensional model by repositioning the selected first face by:
       (i) replacing one or more coordinates of vertices of the first face with coordinates of repositioned vertices based on the repositioning operation;
       (ii) attempting to adjust one or more planes and vertices of a face adjacent to the first face so that adjacent face remains planar;
       (iii) calculating a new plane for the adjacent face; and
       (iv) adjusting vertices of the adjacent face to lie on the new plane.

12. The article of manufacture of claim 11, wherein the logic for adjusting the vertices comprises:
    (a) collecting planes of all faces incident at a first vertex;
    (b) using the new plane instead of the collected plane for each adjacent face;
    (c) if there are at least three non-coplanar planes in the collected planes:

(i) calculating an intersection of any three planes; and
(ii) a resulting intersection point becomes new coordinates for the first vertex;

(d) if there at two non-coplanat planes in the collected planes:
(i) projecting coordinates of the first vertex perpendicularly on a line comprising an intersection between the two non-coplanar planes; and
(ii) the projected coordinates become new coordinates for the first vertex;

(e) if there is a single plane in the collected planes:
(i) projecting coordinates of the first vertex perpendicularly to the single plane; and
(ii) the projected coordinates become new coordinates for the first vertex.

13. The article of manufacture of claim 11, wherein the logic for specifying that the first constraint is not required to be satisfied is performed using a key on a keyboard.

14. An article of manufacture comprising a program storage medium readable by a computer and embodying logic executable by the computer to perform a method for modifying a three-dimensional model, wherein the logic comprises:

displaying a three-dimensional model in a computer-implemented solid modeling system;

selecting a first face of the three-dimensional model;

specifying that a first constraint is not required to be satisfied, wherein the first constraint controls a behavior of a repositioning operation for the first face and the first constraint constrains a geometry of the first face to be fixed; and modifying the three-dimensional model by repositioning the selected first face, wherein each of one or more vertices of the first face is repositioned along a vector that is a cross product of normal vectors of faces adjacent to the first face at each vertex.

15. An article of manufacture comprising a program storage medium readable by a computer and embodying logic executable by the computer to perform a method for modifying a three-dimensional model, wherein the logic comprises:

(a) displaying a three-dimensional model in a computer-implemented solid modeling system;

(b) selecting a first face of the three-dimensional model;

(c) specifying a first constraint that controls a behavior of a repositioning operation for the first face;

(d) modifying the three-dimensional model by repositioning the selected first face, wherein the repositioning operation is constrained in accordance with the specified constraint, and wherein the modifying logic comprises:
(i) cloning the three-dimensional model;
(ii) repositioning the selected first face on the cloned three-dimensional model to create a modified cloned three-dimensional model, wherein the repositioning operation is constrained in accordance with the specified first constraint;
(iii) accepting the repositioning if the repositioning operation returns a success status by displaying the modified cloned three-dimensional model; and
(iv) rejecting the repositioning if the repositioning operation does not return a success status by displaying a last modified cloned three-dimensional model for which a repositioning was successful.

16. A method for modifying a three-dimensional model, comprising:

(a) displaying a three-dimensional model in a computer implemented solid modeling system;

(b) selecting a first face of the three-dimensional model;

(c) specifying a first constraint that controls a behavior of a repositioning operation for the first face, wherein:
(i) the first constraint constrains all planes of faces adjacent to the first face not to change; and
(ii) the first constraint is required to be satisfied; and (d) modifying the three-dimensional model by repositioning the selected first face, wherein:
(i) the repositioning operation is constrained in accordance with the specified first constraint; and
(ii) the repositioning operation causes a geometry of the selected face to change to accommodate the first constraint of the planes of the adjacent faces.

17. The method of claim 16, wherein:

the method further comprises creating a second solid three-dimensional model, wherein the second model is defined by the first face, a second face that is a duplicate of the first face with vertices repositioned based on the repositioning operation, and new side faces between the first face and the second face; and the modifying comprises performing a Boolean operation between the original three-dimensional model and the second three dimensional model, wherein the Boolean operation is based on a direction of a drag vector from the repositioning operation.

18. The method of claim 16, wherein compliance with the first constraint is determined by a user.

19. A computer-implemented system comprising:

(a) a three-dimensional model displayed in a solid modeling system, wherein the model comprises a first face;

(b) a method for modifying the first face, wherein the method is configured to:
(i) select the first face;
(ii) specify a first constraint that is required to be satisfied, controls a behavior of a repositioning operation for the first face, and constrains all planes of faces adjacent to the first face not to change;
(iii) modify the three-dimensional model by repositioning the selected first face, wherein the repositioning operation is constrained in accordance with the specified first constraint and the repositioning operation causes a geometry of the selected face to change to accommodate the first constraint of the planes of the adjacent faces.

20. The system of claim 19, wherein:

the method is further configured to create a second solid three-dimensional model, wherein the second model is defined by the first face, a second face that is a duplicate of the first face with vertices repositioned based on the repositioning operation, and new side faces between the first face and the second face; and the method is configured to modify by performing a Boolean operation between the original thee-dimensional model and the second three dimensional model, wherein the Boolean operation is based on a direction of a drag vector from the repositioning operation.

21. The system of claim 19, wherein compliance with the first constraint is determined by a user.

22. An article of manufacture comprising a program storage medium readable by a computer and embodying logic executable by the computer to perform a method for modifying a three-dimensional model, wherein the logic comprises:

(a) displaying a three-dimensional model in a computer implemented solid modeling system;

(b) selecting a first face of the three-dimensional model;

(c) specifying a first constraint that controls a behavior of a repositioning operation for the first face, wherein:

(i) the first constraint constrains all planes of faces adjacent to the first face not to change; and (ii) the first constraint is required to be satisfied; and (d) modifying the three-dimensional model by repositioning the selected first face, wherein:

(i) the repositioning operation is constrained in accordance with the specified first constraint; and (ii) the repositioning operation causes a geometry of the selected face to change to accommodate the first constraint of the planes of the adjacent faces.

23. The article of manufacture of claim 22, wherein:

the logic further comprises creating a second solid three-dimensional model, wherein the second model is defined by the first face, a second face that is a duplicate of the first face with vertices repositioned based on the repositioning operation, and new side faces between the first face and the second face; and the modifying comprises performing a Boolean operation between the original three-dimensional model and the second three dimensional model, wherein the Boolean operation is based on a direction of a drag vector from the repositioning operation.

24. The article of manufacture of claim 22, wherein compliance with the first constraint is determined by a user.

* * * * *

UNITED STATES PATENT AND TRADEMARK OFFICE
CERTIFICATE OF CORRECTION

PATENT NO. : 6,867,771 B2
DATED : March 15, 2005
INVENTOR(S) : Jiri Kripac

It is certified that error appears in the above-identified patent and that said Letters Patent is hereby corrected as shown below:

Column 11,
Line 4, "at" should read -- are --, "coplanat" should read -- coplanar --.

Signed and Sealed this

Thirteenth Day of September, 2005

JON W. DUDAS
*Director of the United States Patent and Trademark Office*